US012175487B2

(12) United States Patent
Deng et al.

(10) Patent No.: US 12,175,487 B2
(45) Date of Patent: *Dec. 24, 2024

(54) ADJUSTING DEMAND FOR ORDER FULFILLMENT DURING VARIOUS TIME INTERVALS FOR ORDER FULFILLMENT BY AN ONLINE CONCIERGE SYSTEM

(71) Applicant: Maplebear Inc., San Francisco, CA (US)

(72) Inventors: Houtao Deng, Sunnyvale, CA (US); Ji Chen, Mountain View, CA (US); Zi Wang, Mountain View, CA (US); Soren Zeliger, Oakland, CA (US); Ganesh Krishnan, San Francisco, CA (US); Wa Yuan, Alameda, CA (US); Michael Scheibe, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,078

(22) Filed: Nov. 6, 2023

(65) Prior Publication Data
US 2024/0070697 A1 Feb. 29, 2024

Related U.S. Application Data

(63) Continuation of application No. 17/389,281, filed on Jul. 29, 2021, now Pat. No. 11,830,018.

(51) Int. Cl.
*G06Q 10/00* (2023.01)
*G06N 5/04* (2023.01)
(Continued)

(52) U.S. Cl.
CPC ........... *G06Q 30/0206* (2013.01); *G06N 5/04* (2013.01); *G06N 20/00* (2019.01);
(Continued)

(58) Field of Classification Search
None
See application file for complete search history.

(56) References Cited

U.S. PATENT DOCUMENTS 7,543,743 B1   6/2009   Yu et al.
8,498,888 B1   7/2013   Raff et al.
(Continued)

OTHER PUBLICATIONS

RR Alblas et al. (Attribution Modeling)—Mar. 2018, fulfilment of the requirements for the degree of Master of Science in Innovation Management—research.tue.nl. (Year: 2018).*

(Continued)

*Primary Examiner* — Hafiz A Kassim
(74) *Attorney, Agent, or Firm* — Fenwick & West LLP

(57) ABSTRACT

An online concierge system allows users to order items within discrete time intervals later than a time when an order was received or for short-term fulfillment when the order was received. To account for a number of shoppers available to fulfill orders during different discrete time intervals and numbers of orders for fulfillment during different discrete time intervals, the online concierge system specifies a target rate for orders fulfilled later than a specified discrete time interval and a threshold from the target rate. A trained machine learning model periodically predicts a percentage of orders being fulfilled late, with an order associated with a predicted percentage when the order was received. The online concierge system increases a price of orders associated with predicted percentages greater than the threshold from the target rate. The increased price of an order is determined from a price elasticity curve and the predicted percentage.

17 Claims, 7 Drawing Sheets

(51) Int. Cl.
*G06N 20/00* (2019.01)
*G06Q 10/0631* (2023.01)
*G06Q 30/0201* (2023.01)
*G06Q 30/0204* (2023.01)
*G06Q 30/0601* (2023.01)

(52) U.S. Cl.
CPC .. *G06Q 10/06312* (2013.01); *G06Q 10/06313* (2013.01); *G06Q 10/06315* (2013.01); *G06Q 30/0205* (2013.01); *G06Q 30/0635* (2013.01); *G06Q 30/0641* (2013.01)

(56) References Cited

U.S. PATENT DOCUMENTS

| | | | |
|---|---|---|---|
| 9,792,375 B2* | 10/2017 | Gardner | G06F 16/248 |
| 10,726,356 B1 | 7/2020 | Zarandioon et al. | |
| 10,949,894 B1 | 3/2021 | Bansal et al. | |
| 10,956,521 B1* | 3/2021 | Yu | G06F 16/9535 |
| 11,531,845 B1 | 12/2022 | Hunt et al. | |
| 2002/0138358 A1 | 9/2002 | Scheer | |
| 2005/0209909 A1* | 9/2005 | Dull | G06Q 30/0205 |
| | | | 705/7.29 |
| 2011/0071900 A1* | 3/2011 | Kamath | G06Q 30/02 |
| | | | 705/14.46 |
| 2011/0196727 A1 | 8/2011 | Kothandaraman et al. | |
| 2013/0013372 A1* | 1/2013 | Gomez Uribe | G06Q 30/0201 |
| | | | 705/7.29 |
| 2013/0198030 A1* | 8/2013 | Linden | G06Q 30/02 |
| | | | 705/26.7 |
| 2016/0328739 A1* | 11/2016 | Synett | G06Q 30/0245 |
| 2017/0200216 A1 | 7/2017 | Stedehouder et al. | |
| 2017/0293695 A1* | 10/2017 | Brovman | G06Q 30/0251 |
| 2018/0253680 A1* | 9/2018 | Jahani | G06Q 30/0633 |
| 2019/0087841 A1 | 3/2019 | Shariff et al. | |
| 2020/0034879 A1* | 1/2020 | Wai | G06Q 30/0255 |
| 2020/0219171 A1* | 7/2020 | Zhuang | G06Q 30/0635 |
| 2020/0285990 A1* | 9/2020 | Sachdeva | G06Q 30/0201 |
| 2021/0056411 A1 | 2/2021 | Jung | |
| 2021/0406796 A1* | 12/2021 | Liu | G06Q 10/06315 |

OTHER PUBLICATIONS

Lingelbach et al. S.E. Lingelbach "An optimization approach between service level and inventory via simulation: an example from the semiconductor industry", M.Sc. Thesis, Munich, May 2017 (Year: 2017).*

M Rizvi et al. (Attribution modelling of online advertising), 2019—trepo.tuni.fi (Year: 2019).*

Lingelbach, S.E. "An Optimization Approach Between Service Level and Inventory via Simulation: An Example from the Semiconductor Industry," Master's Thesis, University of Twente, May 2017, 123 pages.

* cited by examiner

ADJUSTING DEMAND FOR ORDER FULFILLMENT DURING VARIOUS TIME INTERVALS FOR ORDER FULFILLMENT BY AN ONLINE CONCIERGE SYSTEM

CROSS REFERENCE TO RELATED APPLICATIONS

This application is a continuation of U.S. application Ser. No. 17/389,281, filed Jul. 29, 2021, which is incorporated by reference in its entirety.

BACKGROUND

This disclosure relates generally to ordering items through an online concierge system, and more specifically to adjusting demand for order fulfillment during one or more time intervals for order fulfillment.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

To fulfill orders received from users, the online concierge system estimates numbers of shoppers available for fulfilling orders during different time intervals and allocates a specific amount of the estimated number of shoppers as available to fulfill orders. The specific amount of the estimated shoppers available to fulfill orders during a time window is often less than the total number of estimated number of shoppers available to fulfill orders, allowing an online concierge system to maintain an amount of estimated shoppers for fulfilling orders within the specified time interval of times when the order is placed. While allocating a specific amount of an estimated number of shoppers for fulfilling orders scheduled for specific time windows allows the online concierge system to maintain resources to more rapidly fulfill short-term orders, significant increases in numbers of orders to be fulfilled occupies the specific amount or estimated shoppers available during multiple time windows, limiting time windows during which users may schedule orders for fulfillment. As an online concierge system allows users to schedule fulfillment of orders for time intervals in the future, conventional systems that account for current availability of shoppers and current numbers of orders to adjust demand for fulfillment are unable to effectively adjust scheduling of orders for fulfillment during future time intervals. Such inability to effectively regulate numbers of orders for fulfillment during future time intervals prevents conventional online concierge systems from accounting for increases in order volume during future time intervals that may quickly occupy an amount of estimated shoppers for fulfilling orders within a future time interval. Such a disparity between a number of orders for fulfillment during a future time interval and a number of shoppers available to fulfill orders during the future time interval increases a time for order fulfillment during the future time interval, which decreases likelihoods of users who specified order fulfillment during the future time interval subsequently placing additional orders through the online concierge system.

SUMMARY

An online concierge system maintains a plurality of discrete time intervals during which orders received by the online concierge system are fulfilled. For example, the online concierge system maintains multiple two hour intervals during for fulfilling orders. This allows a user of the online concierge system to select a discrete time interval for an order provided by the user so items included in the order are delivered to the user at a time within the selected discrete time interval. By selecting a discrete time interval, a user of the online concierge system is able to schedule delivery of items in the order at a future time within the selected discrete time interval, allowing the user to tailor when the order is fulfilled. In some embodiments, the online concierge system maintains a maximum interval and allows a user to select a discrete time interval that is within the maximum interval from a time when the order is received by the online concierge system to limit how long in the future the user may schedule fulfillment of the order.

Additionally, the online concierge system allocates a number of estimated shoppers for fulfilling orders during discrete time intervals between orders received before a discrete time interval and specifying the discrete time interval and orders received during the discrete time interval, allowing the online concierge system to maintain a buffer of estimated shoppers for fulfilling orders received to during the discrete time interval or to account for increases in orders identifying the discrete time interval for fulfillment. However, when numbers of orders increase scheduling of order fulfillment is increasingly difficult for users. Further, increasing numbers of orders may increase a number of orders received during a discrete time interval, quickly occupying remaining shoppers for fulfilling orders received during the discrete time interval. This may cause intermittent availability of users to place orders to be fulfilled within the maximum interval from the time when the online concierge system 102 receives the orders.

To mitigate variability in numbers of requests for orders identifying different discrete time intervals for fulfillment, the online concierge system trains a model to determine a predicted percentage of orders identifying a discrete time interval to be fulfilled outside of the discrete time interval; hence, for a discrete time interval, the model determines a predicted percentage of orders identifying the discrete time interval to be fulfilled after the discrete time interval ends. In various embodiments, the online concierge system maintains various geographic regions that each correspond to sets of locations identified by orders. For example a geographic region includes locations within a threshold distance of a reference location corresponding to the geographic region, and the trained model is applied to a geographic region and a discrete time interval to determine a predicted percentage of orders including a location within the geographic region likely to be fulfilled outside of the discrete time interval. This allows the online concierge system to use the predicted percentage of orders identifying a location within a geographic region likely to be fulfilled after the discrete time interval to gauge a business of the geographic region during the discrete time interval.

The trained model accounts for a time between the online concierge system receiving an order from a user and a shopper selecting the order for fulfillment. For example, the online concierge system identifies a location included in an order and determines a geographic region including the location included in the order. Based on a rate at which the online concierge system receives orders including locations within the determined geographic region, a rate at which shoppers select orders including locations within the determined geographic region for fulfillment, a number of orders including locations within the determined geographic region received by the online concierge system and not selected for fulfillment by shoppers, a number of shoppers available during the time interval in the geographic region (or an estimated number of shoppers available during the time interval in the geographic region) the model determines a selection time interval indicating a length of time from receipt of the order by the online concierge system to a shopper selecting the order for fulfillment. The model also accounts for a travel time of a shopper fulfilling the order, accounting for a time interval after the shopper selects the order for fulfillment for the shopper to obtain the items of the order from a warehouse identified by the order and to deliver the items from the order to a location identified by the order. The travel time is determined from characteristics of the order as well as historical information about traffic or road conditions in the geographic region that the online concierge system obtains from a third party system or from previously fulfilled orders by shoppers.

The online concierge system periodically determines a predicted percentage of orders identifying a discrete time interval likely to be fulfilled outside of the discrete time interval by periodically applying the trained model to the discrete time interval. In various embodiments, the online concierge system periodically applies the trained model to a combination of a geographic region and the discrete time interval to determine a predicted percentage of orders identifying the discrete time interval and identifying a location within the geographic region likely to be fulfilled outside of the discrete time interval. This allows the online concierge system to use the predicted percentage of orders likely to be fulfilled outside of the discrete time interval as an estimate of a level of demand for shoppers during the discrete time interval in fulfilling orders, with a higher predicted percentage of orders likely to be fulfilled outside of the discrete time interval indicating increased a higher demand for shoppers to fulfill orders within the discrete time interval. By periodically determining the predicted percentage of orders identifying a discrete time interval likely to be fulfilled outside of the discrete time interval, the online concierge system periodically determines a demand for shoppers during a discrete time interval, such as the demand for shoppers within a discrete time interval within a geographic region.

As fulfilling an order from a user after a discrete time interval identified by the order is likely to deter the user from placing additional orders with the online concierge system, the online concierge system specifies a target rate of orders fulfilled after the discrete time interval identified in the order. In various embodiments, when the predicted percentage of orders likely to be fulfilled after a discrete time interval equals the target rate, the online concierge system subsequently identifies the discrete time interval to users as unavailable, preventing users from identifying the discrete time interval for orders. This allows the online concierge system to prevent users from identifying a discrete time interval for fulfilling an order when a predicted percentage of orders identifying the discrete time interval equals the threshold rate to mitigate the order being fulfilled for the user later than the discrete time interval.

While preventing users from identifying a discrete time interval having at least the threshold rate of orders being fulfilled later than the discrete time interval reduces a likelihood of a user's order being fulfilled after an identified discrete time interval, providing users with fewer discrete time intervals for fulfilling orders may decrease a number of orders received by the online concierge system. To provide users with an increased number of discrete time intervals to select for order fulfillment while preventing a discrete time interval from reaching the threshold rate of orders fulfilled after the discrete time interval, the online concierge system specifies a threshold from the target rate, with the threshold comprising a predicted percentage of orders fulfilled after the discrete time interval that is less than the target rate. The online concierge system stores the threshold. In some embodiments, the online concierge system specifies a threshold from the target rate for a specific geographic region and stores the threshold in association with the geographic region.

When the online concierge system receives a request for an order, the online concierge system determines a predicted percentage of the order being fulfilled after a discrete time interval for short-term fulfillment, such as a specific discrete time interval within a specific time interval of a time when the request was received, as the predicted percentage of orders identifying the specific discrete time interval to be fulfilled after the discrete time interval determined for the specific discrete time interval at a most recent time before a time when the request was received (or determined for the specific discrete time interval when the request was received). For example, the online concierge system determines the predicted percentage of the order being fulfilled after the specific discrete time interval as a predicted percentage of an order being fulfilled after the specific discrete time interval determined for a periodic interval including the time when the request was received.

The online concierge system determines whether the predicted percentage of the order being fulfilled after the specific discrete time interval less than the threshold from the target rate. In response to determining the predicted percentage of the order being fulfilled after the specific discrete time interval is less than the threshold from the target rate, the online concierge system determines the specific discrete time interval is available for fulfilling the order as the predicted percentage of the order being fulfilled after the specific discrete time interval does not indicate excessive demand for shoppers to fulfill orders during the specific discrete time interval. Hence, the online concierge system selects a standard price to fulfill the order during the specific discrete time interval. The online concierge system 102 stores a standard price in association with various discrete time intervals, identifying an amount charged to a user for fulfilling an order identifying a time interval. In some embodiments, the online concierge system stores different standard prices with different times of day, allowing the online concierge system to charge users different amounts for short-term fulfillment of orders for which requests were received at different times. The online concierge system 102 transmits an interface displaying the standard price selected for the specific discrete time interval and other information describing the order to a client device of the user for display.

However, in response to determining the predicted percentage of the order being fulfilled after the specific discrete time interval equals or exceeds the threshold from the target rate, the online concierge system determines an increased price, relative to the standard price for the specific discrete time interval, for fulfilling the order during the specific discrete time interval. Increasing the price relative to the standard price for the specific time interval for short-term fulfillment reduces a likelihood of a user selecting short-term fulfillment of the order during the specific discrete time interval by providing an incentive for the user to select a different discrete time interval having a standard price. Determining the increased price for the specific discrete time interval allows users to select the specific discrete time interval, while at the increased price, preserving the specific discrete time interval as an option for fulfillment of the order.

In various embodiments, to determine the increased price of the specific discrete time interval, the online concierge system generates or retrieves a price elasticity curve, which correlates increased prices with a conversion rate. For example, the conversion rate identifies a rate at which users place an order with the online concierge system, allowing the price elasticity curve to indicate a rate at which users place an order with the online concierge system when the users are charged different increased prices. In various embodiments, the online concierge system generates the price elasticity curve based on historical orders received from users and prices presented to users for the historical orders using any suitable method or combination of methods (e.g., regression analysis, interpolation, etc.), allowing the online concierge system to leverage information about prior orders received from users to determine how changes in prices for fulfilling an order affects a rate at which users place orders with the online concierge system for fulfillment.

The online concierge system may select a specific conversion rate and determine the increased price of the specific discrete time interval as a price corresponding to the specific conversion rate on the price elasticity curve. Alternatively, the online concierge system determines a conversion rate for the increased price based on a conversion rate for the standard price from the price elasticity curve, a number of received requests for orders with a predicted percentage of being fulfilled after the specific discrete time interval greater than the threshold from the target rate and less than the target rate, and a number of received requests for orders with a predicted percentage of being fulfilled after the specific discrete time interval greater than the target rate. For example, the conversion rate at the increased price is a ratio of a product of the number of received requests for orders with a predicted percentage of being fulfilled after the specific discrete time interval greater than the threshold from the target rate and less than the target rate and the conversion rate at the standard price to a sum of the number of received requests for orders with the predicted percentage of being fulfilled after the specific discrete time interval greater than the threshold from the target rate and less than the target rate and the number of received requests for orders with the predicted percentage of being fulfilled after the specific discrete time interval greater than the target rate.

The online concierge system transmits an interface identifying the specific discrete time interval and the increased price determined for the specific discrete time interval to a client device for display to the user. In various embodiments, the interface identifies the specific discrete time interval and other discrete time intervals along with prices corresponding to each discrete time interval (i.e., a standard price or an increased price corresponding to each discrete time interval). The user subsequently selects a discrete time interval for fulfilling the order, allowing the user to account for the prices determined for various discrete time intervals when selecting the discrete time interval for order fulfillment.

The online concierge system allows users to select a discrete time interval for fulfilling the order greater than a duration from a time when a request for the order was received. For example, the specific discrete time interval specifies short-term fulfillment of the order within a specific duration of a time when the request for the order was received, while other discrete time intervals specify fulfillment of the order at times greater than the specific duration from the time when the request for the order was received. For discrete time intervals later than the specific duration of the time when the request for the order was received, the online concierge system has more limited information for determining a predicted percentage of orders being fulfilled after the discrete time interval.

To regulate a number of orders specifying fulfillment during a discrete time interval later than the specific duration from the time when a request for an order was received, the online concierge system assigns a forecasted number of orders to each discrete time interval later than the specific duration from the time when a request for an order was received. The forecasted number of orders for a discrete time interval is based on prior numbers of orders identifying the discrete time interval, an estimated number of shoppers available to fulfill orders during the discrete time interval, and any other suitable information in various embodiments. Hence, the forecasted number of orders allows the online concierge system to specify a maximum number of orders capable of being fulfilled during the discrete time interval. In various embodiments, when the online concierge system receives the forecasted number of orders identifying the discrete time interval, the discrete time interval is withheld from selection by users for order fulfillment.

Additionally, the online concierge system generates a demand curve for the discrete time interval from times when the online concierge system previously received orders identifying the discrete time interval relative to a start of the discrete time interval. In various embodiments, the demand curve identifies a percentage of orders identifying the discrete time interval at different times before a start of the discrete time interval. For example, the demand curve identifies a percentage of orders identifying the discrete time interval that were received different numbers of hours before a start of the discrete time interval (e.g., received four hours before the start of the discrete time interval, received one hour before the start of the discrete time interval, etc.). Hence, the demand curve identifies when the online concierge system receives orders identifying the discrete time interval for fulfillment relative to the start of the discrete time interval. The online concierge system determines the demand curve for the discrete time interval using any suitable method or combination of methods (e.g., regression analysis, interpolation, etc.) in various embodiments. Additionally, different discrete time intervals have different demand curves, as the demand curve for a particular discrete time interval is determined from previously received orders identifying the particular discrete time interval for fulfillment. In some embodiments, the online concierge system generates a demand curve for various combinations of geographic region and discrete time interval, allowing the online concierge system to maintain different demand curves for a discrete time interval corresponding to different geographic regions, allowing the online concierge system to account for different ordering patterns in different geographic regions. Similarly, the online concierge system may generate a demand curve for various combinations of warehouse and discrete time interval, allowing maintenance of demand curves for discrete time intervals that are specific to different warehouses, allowing the online concierge system to account for different patterns of ordering from different warehouses.

From the price elasticity curve that correlates increased prices with a conversion rate (further described above), the forecasted number, and the previously received orders identifying a discrete time interval, the online concierge system generates a demand pacing curve for the discrete time interval. For example, the conversion rate identifies a rate at which users place an order with the online concierge system, so the price elasticity curve to indicate a rate at which users place an order with the online concierge system when the users are charged different increased prices, providing the online concierge system with a measure of how different prices affect a likelihood of a user placing an order for fulfillment. In various embodiments, the demand pacing curve specifies a rate at which users place orders with the online concierge system identifying the discrete time interval at different times prior to a start of the discrete time interval so a number of orders identifying the discrete time interval equals the forecasted value for the discrete time interval at the start of the discrete time interval. The demand pacing curve specifies a threshold for number of orders received at different times prior to a start of the discrete time interval. When a number of orders identifying the discrete time interval at a time prior to the start of the discrete time interval is less than a value for the time on the demand curve, the number of orders identifying the discrete time interval for fulfillment is not likely to exceed the threshold value for the discrete time interval (or is not likely to reach the threshold value for the discrete time interval before the start of the discrete time interval), so the online concierge system maintains a standard price for the discrete time interval. However, when number of orders identifying the discrete time interval at a time prior to the start of the discrete time interval greater than a value for the time on the demand curve, the number of orders identifying the discrete time interval for fulfillment is likely to exceed the threshold value for the discrete time interval (or reach the threshold value prior to the start of the discrete time interval). So, the online concierge system determines an increased price for the discrete time interval when the number of orders at a time prior to the start of the discrete time interval exceeds a value specified by the demand pacing curve at the time prior to the start of the discrete time interval, with the increased price seeking to reduce a number of orders identifying the discrete time interval for fulfillment.

When the online concierge system receives a request for an order, the online concierge system determines a current number of orders identifying the discrete time interval from orders previously received by the online concierge system. The online concierge system determines whether the current number of orders identifying the discrete time interval exceeds a value for the time relative to the start of the discrete time interval at which the request for the order was received from the demand pacing curve. In response to determining the current number of orders identifying the discrete time interval does not exceed the value for the time relative to the start of the discrete time interval at which the request for the order was received 820 from the demand pacing curve, the online concierge system selects a standard price for the discrete time interval. However, in response to determining the current number of orders identifying the discrete time interval exceeds the value for the time relative to the start of the discrete time interval at which the request for the order was received from the demand pacing curve, the online concierge system generates an increased price for the discrete time interval.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
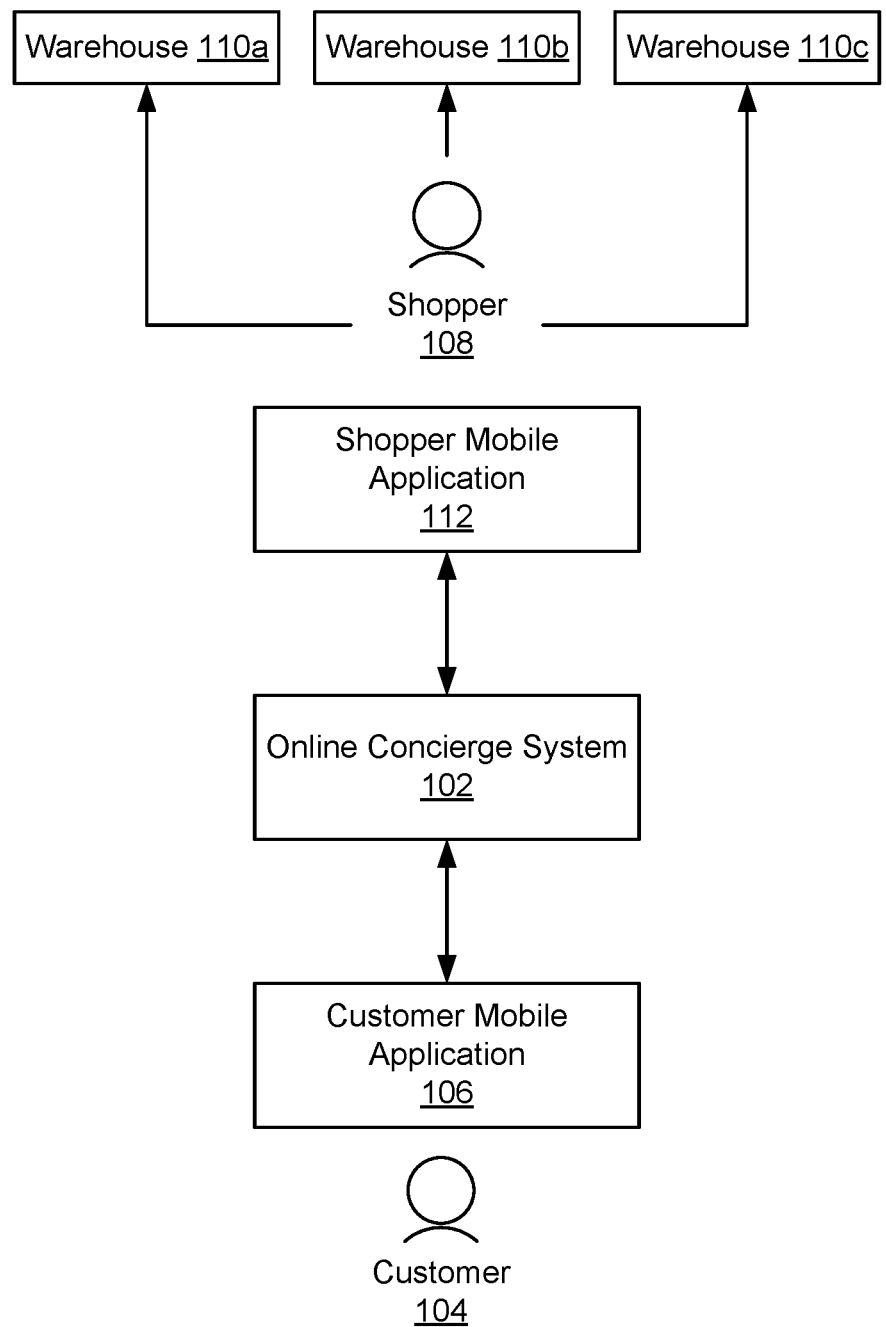
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
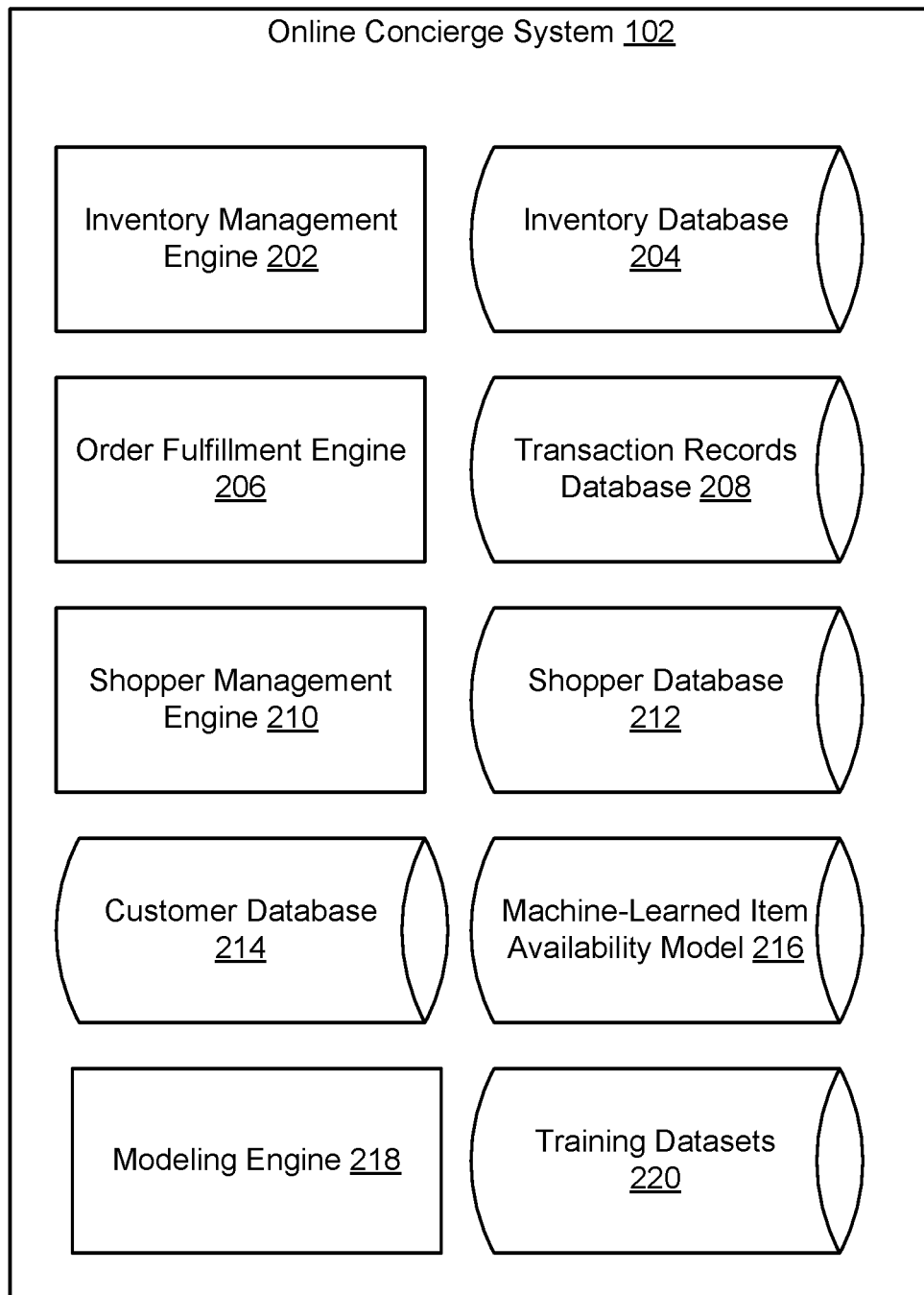
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 selects a group of orders, allowing a shopper to choose to fulfill each of the orders included in the group. In various embodiments, the order fulfillment engine 206 maintains discrete time intervals for fulfilling orders and a user identifies a discrete time interval in an order, allowing the user to specify a time window when items from the order are delivered to the user. To allow the order fulfillment engine 206 or the shopper management engine 210 greater flexibility in shoppers capable of fulfilling an order, a user may include a flag authorizing flexible fulfillment as well as identifying a discrete time interval. The flag authorizing flexible fulfillment allows items from the order to be delivered at any time between a time when the online concierge system 102 received the order and the discrete time interval identified by the order. The order fulfillment engine 206 or the shopper management engine 210 allocates a specified percentage of shoppers estimated to be available during a discrete time interval or available during a discrete time interval for fulfilling previously received orders identifying the discrete time interval. The specified percentage is less than 100%, allowing the order fulfillment engine 206 or the shopper management engine 210 to maintain a reserve of shoppers who are not allocated for fulfilling previously received orders identifying a discrete time interval.

The order fulfillment engine 206 also maintains prices for different discrete time intervals to identify an amount charged to a user for identifying a discrete time interval for fulfilling an order. To regulate numbers of orders identifying different discrete time intervals, the order fulfillment engine increases a price of a discrete time interval when one or more criteria are satisfied. For a specific discrete time interval for short-term fulfillment of an order within a specific time interval of a time when a request for the order was received, the order fulfillment engine 206 compares a predicted percentage of orders fulfilled after the specific discrete time interval to a threshold, as further described below in conjunction with FIGS. 5-7, and increases the price of the specific discrete time interval if the predicted percentage is not less than the threshold. As further described below in conjunction with FIG. 5, the order fulfillment engine determines the predicted percentage of orders fulfilled after the specific discrete time interval at periodic intervals in some embodiments, with the predicted percentage for a request for an order determined as the predicted percentage determined for a periodic interval including the time when the request was received. Comparing the predicted percentage of fulfillment after the specific time interval to the threshold allows the order fulfillment engine 206 to increase a price before the predicted percentage of fulfillment after the specific discrete time interval reaching a target rate, at which the online concierge system 206 prevents users from identifying the specific discrete time interval for order fulfillment. This increases a number of requests for orders capable of selecting the specific discrete time interval, while increasing the price of the specific time interval decreases a number of users likely to select the specific discrete time interval.

For discrete time intervals for fulfillment of orders greater than a specific time interval of a time when a request for the order was received, the order fulfillment engine 206 determines a forecasted value for each discrete time interval from historical orders identifying discrete time intervals. The forecasted value specifies a maximum number of orders for fulfillment in a discrete time interval. From the forecasted value and prior orders received from users, the order fulfillment engine 206 generates a demand curve for each discrete time interval. As further described below in conjunction with FIG. 8, the demand pacing curve specifies a rate at which users place orders with the online concierge system identifying a discrete time interval at different times prior to a start of the discrete time interval so a number of orders identifying the discrete time interval equals the forecasted value for the discrete time interval at the start of the discrete time interval. Hence, the demand pacing curve specifies a threshold for number of orders received at different times prior to a start of the discrete time interval. When a request for an order is received, the order fulfillment engine compares a current number of orders identifying the discrete time interval for fulfillment to a value from the demand curve corresponding to a time prior to the start of the discrete time interval corresponding to a time when the request for the order was received. If the current number of orders identifying the discrete time interval for fulfillment exceeds the value from the demand pacing curve, the order fulfillment engine increases a price of the discrete time interval, as further described below in conjunction with FIG. 8.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained model to determine a predicted percentage of orders identifying a discrete time interval to be fulfilled outside of the discrete time interval, as further describe below in conjunction with FIG. 5. For a discrete time interval, the model determines a predicted percentage of orders identifying the discrete time interval to be fulfilled after the discrete time interval ends. In various embodiments, the model accounts for a time between the online concierge system receiving an order from a user and a shopper selecting the order for fulfillment. For example, from a location included in an order, the modeling engine 218 determines a geographic region including the location included in the order. Based on a rate at which the online concierge system 102 receives orders including locations within the determined geographic region, a rate at which shoppers select orders including locations within the determined geographic region for fulfillment, a number of orders including locations within the determined geographic region received by the online concierge system 102 and not selected for fulfillment by shoppers, a number of shoppers available during the time interval in the geographic region (or an estimated number of shoppers available during the time interval in the geographic region) the model determines a selection time interval indicating a length of time from receipt of the order by the online concierge system 102 to a shopper selecting the order for fulfillment. The model also accounts for a travel time of a shopper fulfilling the order, accounting for a time interval after the shopper selects the order for fulfillment for the shopper to obtain the items of the order from a warehouse 110 identified by the order and to deliver the items from the order to a location identified by the order. The travel time is determined from characteristics of the order as well as historical information about traffic or road conditions in the geographic region that the online concierge system 102 obtains from a third party system or from previously fulfilled orders by shoppers. The model may be trained 515 using any suitable technique from training data including labeled examples of previously fulfilled orders, with a label applied to an example indicating whether a previously fulfilled order was fulfilled within a discrete time interval identified by the order or was fulfilled after the discrete time interval identified by the order. The model may be any type of machine learning model, such as a neural network, boosted tree, gradient boosted tree, random forest model, or combination of machine learning models, and the model may be trained with any suitable training method, such as supervised learning, semi-supervised learning, or unsupervised learning. Hence, the model accounts for a number of orders received by the online concierge system 102 and a time for a shopper to fulfill an order during a discrete time interval to predict a percentage of orders identifying the discrete time interval that are fulfilled after the discrete time interval.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
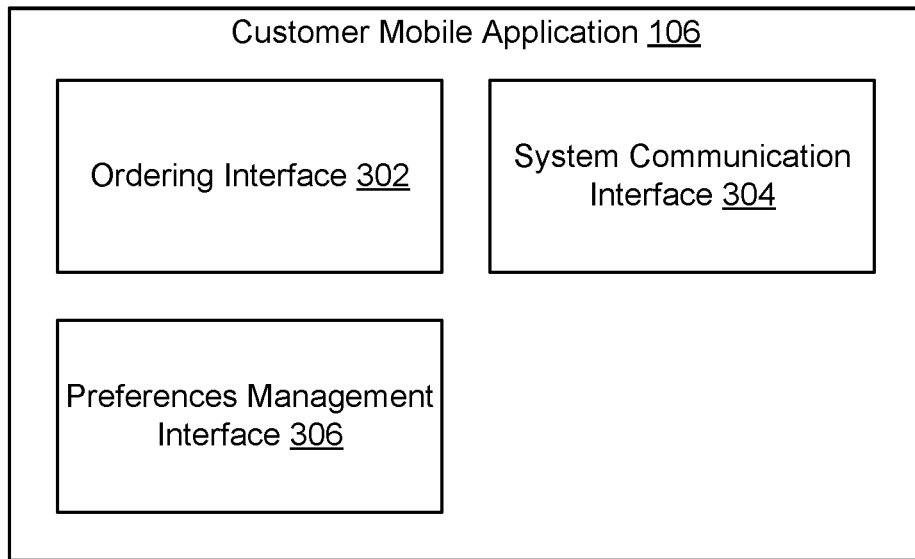
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
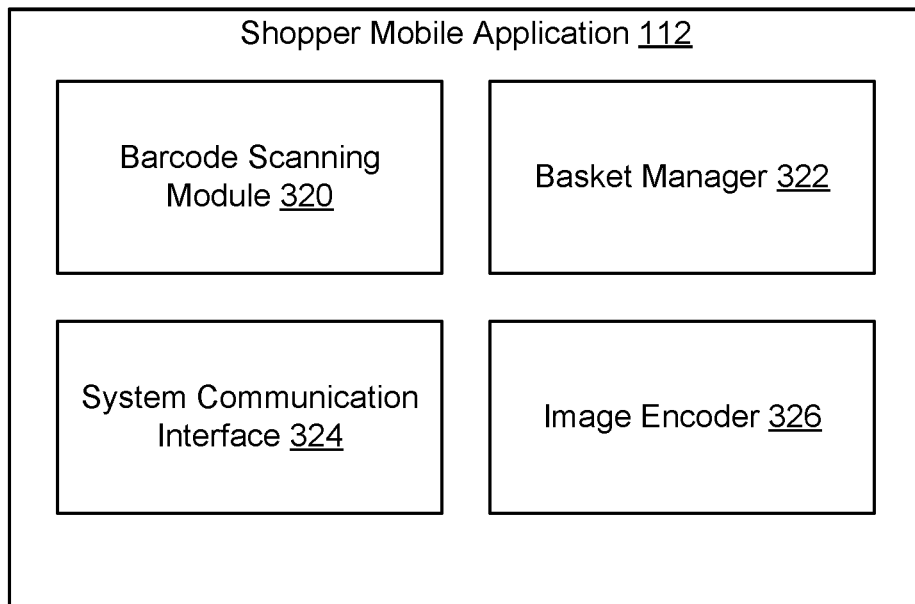
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
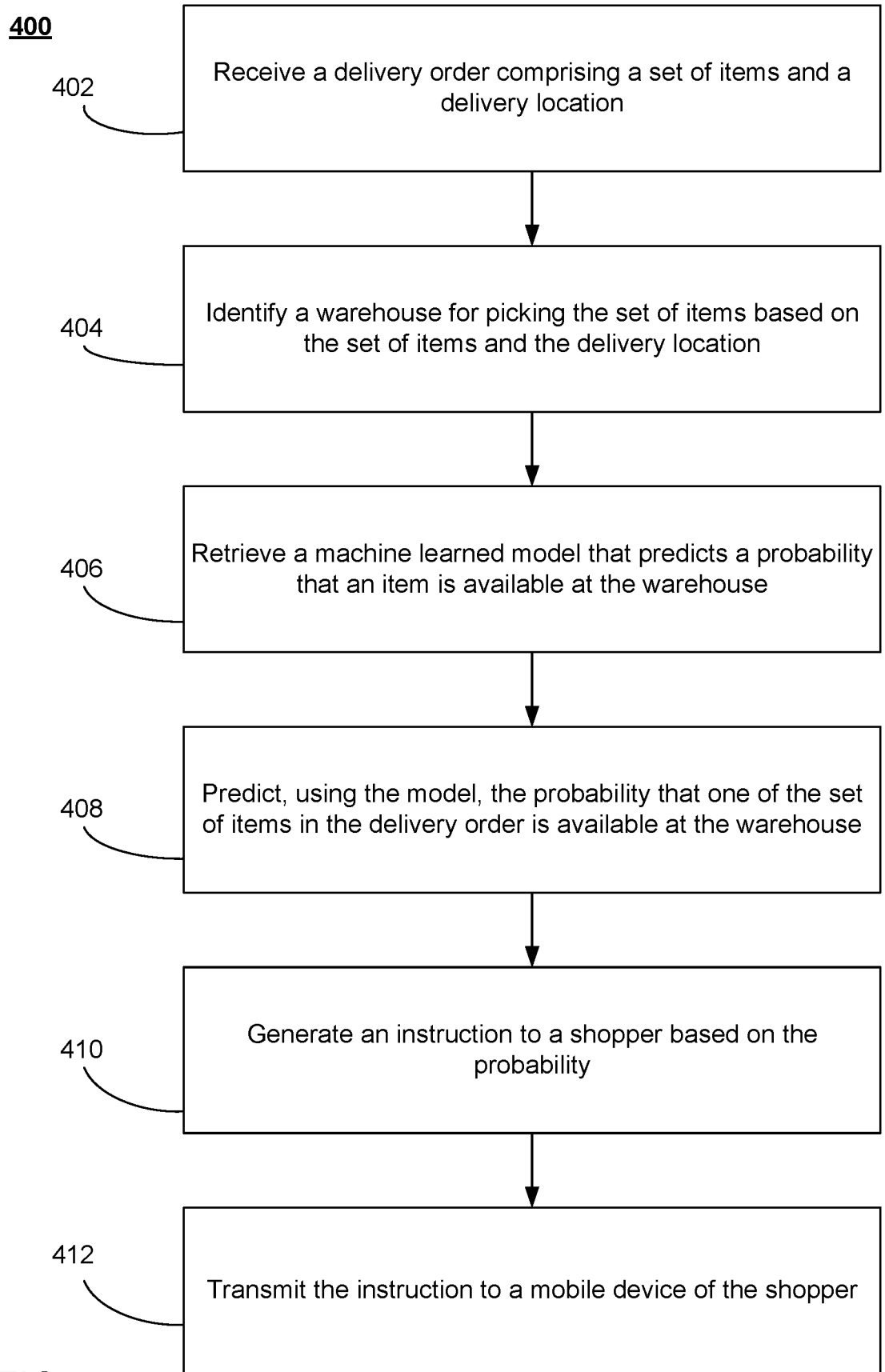
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Figure 5:
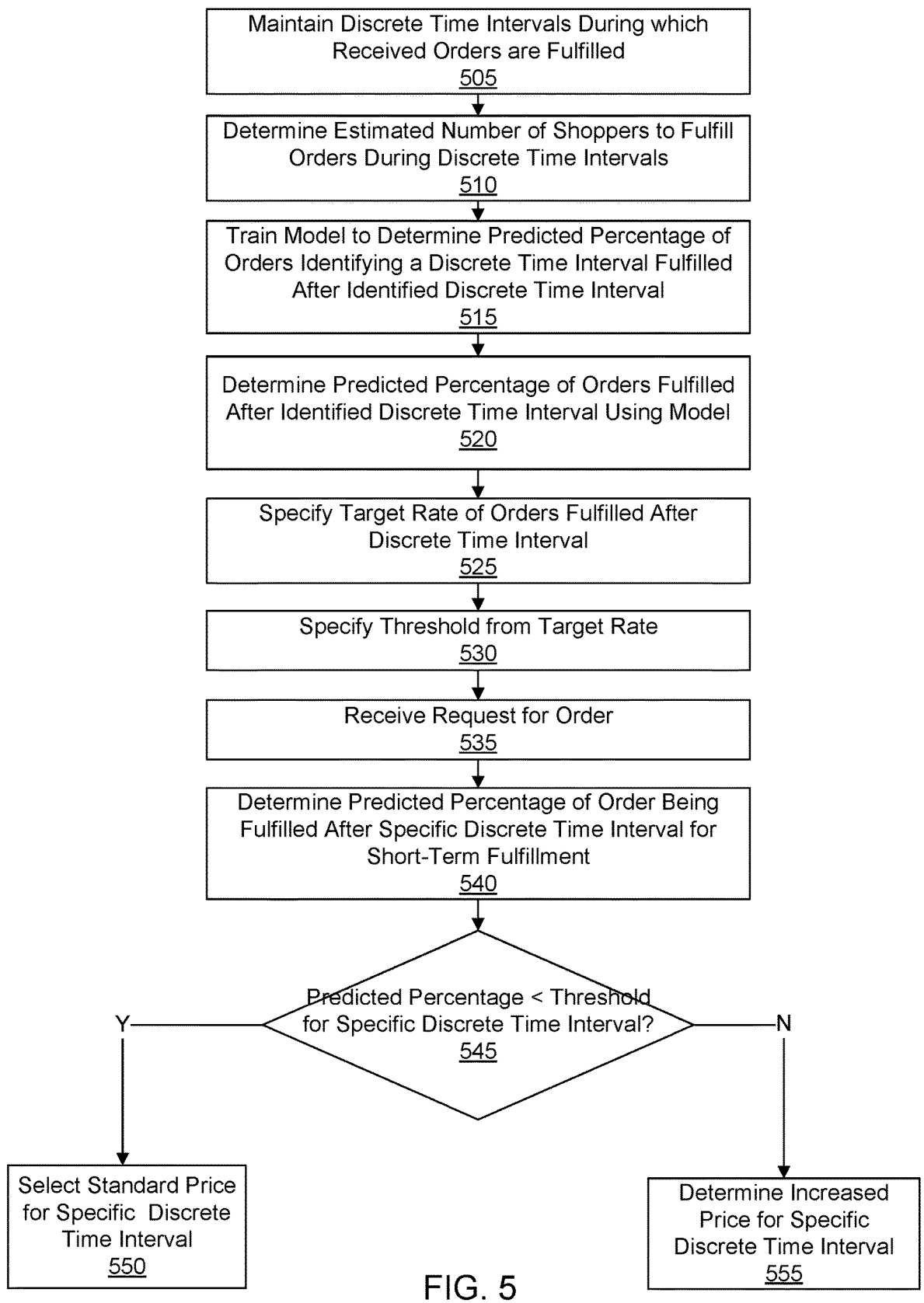
FIG. 5 is a flowchart of a method for adjusting a price for a discrete time interval for short-term fulfillment of an order by an online concierge system, according to one embodiment.

Adjusting Pricing of Orders for Fulfillment During a Time Interval to Regulate Orders Identifying the Time Interval for Fulfillment FIG. 5 is a flowchart of one embodiment of a method for adjusting a price for a discrete time interval for short-term fulfillment of an order by an online concierge system 102. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 maintains 505 a plurality of discrete time intervals during which orders received by the online concierge system are fulfilled. For example, the online concierge system 505 maintains multiple two hour intervals during for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled. In some embodiments, the online concierge system 102 maintains a maximum interval and allows a user to select a discrete time interval that is within the maximum interval from a time when the order is received by the online concierge system 102 to limit how long in the future the user may schedule fulfillment of the order.

From previously fulfilled orders, the online concierge system 102 determines 510 an estimated number of shoppers available to fulfill orders during each of at least a set of the discrete time intervals. For example, the online concierge system 102 determines 510 an estimated number of shoppers available to fulfill orders during each of the discrete time intervals. In various embodiments, the online concierge system 102 applies a trained machine learned model to historical numbers of shoppers available to fulfill orders, or who fulfilled orders, at different discrete time intervals and characteristics of the discrete time interval (e.g., weekday or weekend, time of day, day of the week, day of the month, etc.), as well as a geographic location. To determine 510 the estimated number of shoppers, the trained machine learned model receives a discrete time interval and a geographic location and determines 510 the estimated number of shoppers available to fulfill orders during the discrete time interval based on historical numbers of shoppers available during prior time intervals corresponding to the discrete time interval, as well as the geographic location. The trained machine learned model for determining 510 the estimated number of shoppers during a discrete time interval may be trained using any suitable method or combination of methods (e.g., supervised learning, unsupervised learning, semi-supervised learning, etc.). In various embodiments, the online concierge system 102 determines 510 an estimated number of shoppers available to fulfill orders during each discrete time interval of a set. For example, the set of discrete time intervals includes each discrete time interval within the maximum interval from a current time.

The online concierge system 102 maintains a specified percentage of shoppers to allocate per discrete time interval for fulfilling orders. Based on the specified percentage, the online concierge system 102 allocates the specified percentage of estimated shoppers for a discrete time interval for fulfilling orders specifying the discrete time interval. The specified percentage of estimated shoppers for a discrete time interval for fulfilling orders specifying the discrete time interval is less than 100%, with the remaining percentage of the estimated shoppers for the discrete time interval are allocated by the online concierge system 102 for fulfilling orders received during the discrete time interval and indicating short term fulfillment (i.e., fulfillment within a threshold amount of time from a time when the order was received). This allocation allows the online concierge system 102 to divide the number of estimated shoppers during the discrete time interval between orders received before the discrete time interval that specify fulfillment during the discrete time interval and orders received during the discrete time interval identifying short term fulfillment for fulfillment. In some embodiments, the specified percentage is constant for different discrete time intervals. For example, the specified percentage is 70%, so the online concierge system 102 allocates 70% of the estimated number of shoppers for the discrete time interval to fulfill orders received before the discrete time interval that specify fulfillment during the discrete time interval and allocates 30% of the estimated number of shoppers for the discrete time interval to fulfill orders indicating short term fulfillment and received during the discrete time interval. In other embodiments, the online concierge system 102 maintains different specified percentage for different discrete time intervals; for example, the online concierge system 102 maintains a specified percentage for discrete time intervals occurring within a portion of a day (e.g., a morning) and a different specified percentage for discrete time intervals occurring within a different portion of the day (e.g., an afternoon).

This allocation of estimated shoppers for fulfilling orders during discrete time intervals between orders received before a discrete time interval and specifying the discrete time interval and orders received during the discrete time interval allows the online concierge system 102 to maintain a buffer of estimated shoppers for fulfilling orders received to during the discrete time interval or to account for increases in orders identifying the discrete time interval for fulfillment. However, when numbers of orders increase, because the specified percentage is less than 100% of the estimated shoppers for fulfilling orders during different discrete time intervals, discrete time intervals capable of being specified by orders from users decrease, making scheduling of order fulfillment difficult for users. Further, increasing numbers of orders may increase a number of orders received during a discrete time interval, quickly occupying remaining shoppers for fulfilling orders received during the discrete time interval. This may cause intermittent availability of users to place orders to be fulfilled within the maximum interval from the time when the online concierge system 102 receives the orders.

Additionally, the online concierge system 102 trains 515 a model to determine a predicted percentage of orders identifying a discrete time interval to be fulfilled outside of the discrete time interval; hence, for a discrete time interval, the model determines a predicted percentage of orders identifying the discrete time interval to be fulfilled after the discrete time interval ends. In various embodiments, the online concierge system 102 maintains various geographic regions that each correspond to sets of locations identified by orders. For example a geographic region includes locations within a threshold distance of a reference location corresponding to the geographic region, and the trained model is applied to a geographic region and a discrete time interval to determine a predicted percentage of orders including a location within the geographic region likely to be fulfilled outside of the discrete time interval. This allows the online concierge system 102 to use the predicted percentage of orders identifying a location within a geographic region likely to be fulfilled after the discrete time interval to gauge a business of the geographic region during the discrete time interval.

The trained model accounts for a time between the online concierge system 102 receiving an order from a user and a shopper selecting the order for fulfillment. For example, the online concierge system 102 identifies a location included in an order and determines a geographic region including the location included in the order. Based on a rate at which the online concierge system 102 receives orders including locations within the determined geographic region, a rate at which shoppers select orders including locations within the determined geographic region for fulfillment, a number of orders including locations within the determined geographic region received by the online concierge system 102 and not selected for fulfillment by shoppers, a number of shoppers available during the time interval in the geographic region (or an estimated number of shoppers available during the time interval in the geographic region) the model determines a selection time interval indicating a length of time from receipt of the order by the online concierge system 102 to a shopper selecting the order for fulfillment. The model may account for any additional factors describing receipt of orders with locations within the determined geographic region and selection of orders with locations within the determined geographic region by shoppers for fulfillment in various embodiments.

The model also accounts for a travel time of a shopper fulfilling the order, accounting for a time interval after the shopper selects the order for fulfillment for the shopper to obtain the items of the order from a warehouse 110 identified by the order and to deliver the items from the order to a location identified by the order. The travel time is determined from characteristics of the order as well as historical information about traffic or road conditions in the geographic region that the online concierge system 102 obtains from a third party system or from previously fulfilled orders by shoppers. Characteristics of the order used to determine travel time include a number of items in the order (orders with greater number of items may increase a length of time in a warehouse 110 to obtain the items), a warehouse 110 from which the items are obtained, and a distance between the location of the warehouse 110 from which the items are obtained and a location identified by the order. Hence, the model accounts for characteristics of orders specifying locations within the geographic region, shoppers available within the geographic region, and characteristics of a geographic region including a location identified by the order to determine predicted percentage of orders likely to be fulfilled outside of the discrete time interval. The model may be trained 515 using any suitable technique from training data including labeled examples of previously fulfilled orders, with a label applied to an example indicating whether a previously fulfilled order was fulfilled within a discrete time interval identified by the order or was fulfilled after the discrete time interval identified by the order. The model may be any type of machine learning model, such as a neural network, boosted tree, gradient boosted tree, random forest model, or combination of machine learning models, and the model may be trained with any suitable training method, such as supervised learning, semi-supervised learning, unsupervised learning, etc.

To train the model, the online concierge system 102 applies the model to each of a plurality of examples of the training data. For an example of the training data, application of the conversion model to the example generates a predicted percentage of orders identifying a discrete time interval likely to be fulfilled outside of the discrete time interval identified by the orders. The online concierge system 102 determines an error term from a difference between the label applied to the example of the training data and the predicted percentage of an order of the examples being fulfilled after a discrete time interval identified by the order. The error term may be generated through any suitable loss function, or combination of loss functions, in various embodiments. For example, the loss function is a mean squared error between a percentage of an order of the examples being fulfilled after a discrete time interval identified by the order and a label applied to the corresponding example of the training data. However, in other embodiments, any loss function or combination of loss functions, may be applied to the predicted percentage of an order of the examples being fulfilled after a discrete time interval identified by the order and the label applied to the corresponding example of the training data to generate the error term.

The online concierge system 102 backpropagates the one or more error terms from the label applied to an example of the training data and the predicted percentage of an order of the examples being fulfilled after a discrete time interval identified by the order through layers of a network comprising the model. One or more parameters of the network are modified through any suitable technique from the backpropagation of the one or more error terms through the layers of the network. For example, weights between nodes of the network, such as nodes in different layers of the network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the network. For example, the online concierge system 102 stores the weights of connections between nodes in the network as the set of parameters of the network in a non-transitory computer readable storage medium. Hence, training of the conversion model allows the online concierge system 102 to generate and to store a neural network, or other machine learning model, that generates a predicted percentage of an order of the examples being fulfilled after a discrete time interval identified by the order. The model may be any machine learning model, such as a neural network, boosted tree, gradient boosted tree or random forest model in various embodiments. In some examples, the conversion model is trained via a XGBoost process when the model is applied to examples of the training data. The online concierge system 102 retrains the model at various intervals, such as at a periodic interval.

Alternatively, the online concierge system 102 generates the model as a tree based ensemble model combining multiple decision trees. In various embodiments, the online concierge system 102 selects at least a set of examples of the training data and trains a decision tree on each example of the set by applying a decision tree to each example and comparing a predicted percentage of an order of the examples being fulfilled after a discrete time interval identified by the order to a label applied to the example. For example, the decision tree iteratively selects features of an example of the training data and selects a feature causing a loss function to satisfy one or more criteria, for example a feature minimizing a squared error between a probability of receiving an order from a user and a label applied to the example of the training data. The online concierge system 102 sums the loss function over each example of the set to determine a total loss function and selects a feature having a minimum total loss function across the examples of the training data. Subsequently, the online concierge system 102 splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The model comprises the set of trained decision trees, with individual decision trees predicting a percentage of an order of the examples being fulfilled after a discrete time interval identified by the order, with the model outputting a predicted percentage of an order of the examples being fulfilled after a discrete time interval identified by the order r predicted by at least a threshold number of the decision trees.

As another example, the online concierge system 102 trains multiple decision trees in series, training an initial decision tree as described above and determining a loss function for the initial decision tree based on differences between a predicted probability of the online concierge system 102 receiving an order from input features of an example of the training data and a label applied to the example of the training data. For example, the loss function is a squared error function between the predicted probability of the online concierge system 102 receiving an order from a user and the label applied to the example of the training data. The online concierge system 102 trains another decision tree based on the results of the loss function for each example of the training data and iteratively trains decision tress, with results of the loss function from a decision tree used to train an immediately subsequent decision tree. For example, a gradient of the loss function from a decision tree is used to train an immediately subsequent decision tree. The online concierge system 102 iteratively trains decision trees from the results of the loss function from another decision tree until a specific number of decision trees are trained or until one or more other halting criteria are satisfied. By iteratively propagating a result of a loss function for a decision tree to a subsequent decision tree, an output of a decision tree compensates for errors from an earlier another tree from which the decision tree receives results of the loss function. The output of the model is a combination (e.g., a sum) of the predicted percentage of an order being fulfilled after a discrete time interval identified by the order.

The online concierge system 102 periodically determines 520 a predicted percentage of orders identifying a discrete time interval likely to be fulfilled outside of the discrete time interval by periodically applying the trained model to the discrete time interval. In various embodiments, the online concierge system 102 periodically applies the trained model to a combination of a geographic region and the discrete time interval to determine 520 a predicted percentage of orders identifying the discrete time interval and identifying a location within the geographic region likely to be fulfilled outside of the discrete time interval. This allows the online concierge system 102 to use the predicted percentage of orders likely to be fulfilled outside of the discrete time interval as an estimate of a level of demand for shoppers during the discrete time interval in fulfilling orders, with a higher predicted percentage of orders likely to be fulfilled outside of the discrete time interval indicating increased a higher demand for shoppers to fulfill orders within the discrete time interval. By periodically determining 520 the predicted percentage of orders identifying a discrete time interval likely to be fulfilled outside of the discrete time interval, the online concierge system 102 periodically determines a demand for shoppers during a discrete time interval, such as the demand for shoppers within a discrete time interval within a geographic region.

As fulfilling an order from a user after a discrete time interval identified by the order is likely to deter the user from placing additional orders with the online concierge system 102, the online concierge system 102 specifies 525 a target rate of orders fulfilled after the discrete time interval identified in the order. For example, the target rate is 10% or 15% of orders fulfilled after the discrete time interval identified in the order. In various embodiments, when the predicted percentage of orders likely to be fulfilled after a discrete time interval equals the target rate, the online concierge system 102 subsequently identifies the discrete time interval to users as unavailable, preventing users from identifying the discrete time interval for orders. This allows the online concierge system 102 to prevent users from identifying a discrete time interval for fulfilling an order when a predicted percentage of orders identifying the discrete time interval equals the threshold rate to mitigate the order being fulfilled for the user later than the discrete time interval.

While preventing users from identifying a discrete time interval having at least the threshold rate of orders being fulfilled later than the discrete time interval reduces a likelihood of a user's order being fulfilled after an identified discrete time interval, providing users with fewer discrete time intervals for fulfilling orders may decrease a number of orders received by the online concierge system 102. To provide users with an increased number of discrete time intervals to select for order fulfillment while preventing a discrete time interval from reaching the threshold rate of orders fulfilled after the discrete time interval, the online concierge system 102 specifies 530 a threshold from the target rate, with the threshold comprising a predicted percentage of orders fulfilled after the discrete time interval that is less than the target rate. The online concierge system 102 stores the threshold. In some embodiments, the online concierge system 102 specifies 530 a threshold from the target rate for a specific geographic region and stores the threshold in association with the geographic region.

When the online concierge system 102 receives 535 a request for an order, the online concierge system 102 determines 540 a predicted percentage of the order being fulfilled after a discrete time interval for short-term fulfillment, such as a discrete time interval within a specific time interval of a time when the request was received 535, as the predicted percentage of orders identifying the specific discrete time interval to be fulfilled after the discrete time interval determined 520 for the specific discrete time interval at a most recent time before a time when the request was received 535 (or determined 520 for the specific discrete time interval when the request was received 535). The online concierge system 102 determines 545 whether the predicted percentage of the order being fulfilled after the specific discrete time interval less than the threshold from the target rate.

In response to determining 545 the predicted percentage of the order being fulfilled after the specific discrete time interval is less than the threshold from the target rate, the online concierge system 140 determines the specific discrete time interval is available for fulfilling the order as the predicted percentage of the order being fulfilled after the specific discrete time interval does not indicate excessive demand for shoppers to fulfill orders during the specific discrete time interval. Hence, the online concierge system 140 selects 550 a standard price to fulfill the order during the specific discrete time interval. The online concierge system 102 stores a standard price in association with various discrete time intervals, identifying an amount charged to a user for fulfilling an order identifying a time interval. In some embodiments, the online concierge system 102 stores different standard prices with different times of day, allowing the online concierge system 102 to charge users different amounts for short-term fulfillment of orders for which requests were received at different times. The online concierge system 102 transmits an interface displaying the standard price selected 550 for the specific discrete time interval and other information describing the order to a client device of the user for display.

However, in response to determining 545 the predicted percentage of the order being fulfilled after the specific discrete time interval equals or exceeds the threshold from the target rate, the online concierge system 102 determines 555 an increased price, relative to the standard price for the specific discrete time interval, for fulfilling the order during the specific discrete time interval. Increasing the price relative to the standard price for the specific time interval for short-term fulfillment reduces a likelihood of a user selecting short-term fulfillment of the order during the specific discrete time interval by providing an incentive for the user to select a different discrete time interval having a standard price. Determining the increased price for the specific discrete time interval allows users to select the specific discrete time interval, while at the increased price, preserving the specific discrete time interval as an option for fulfillment of the order.

Figure 6:
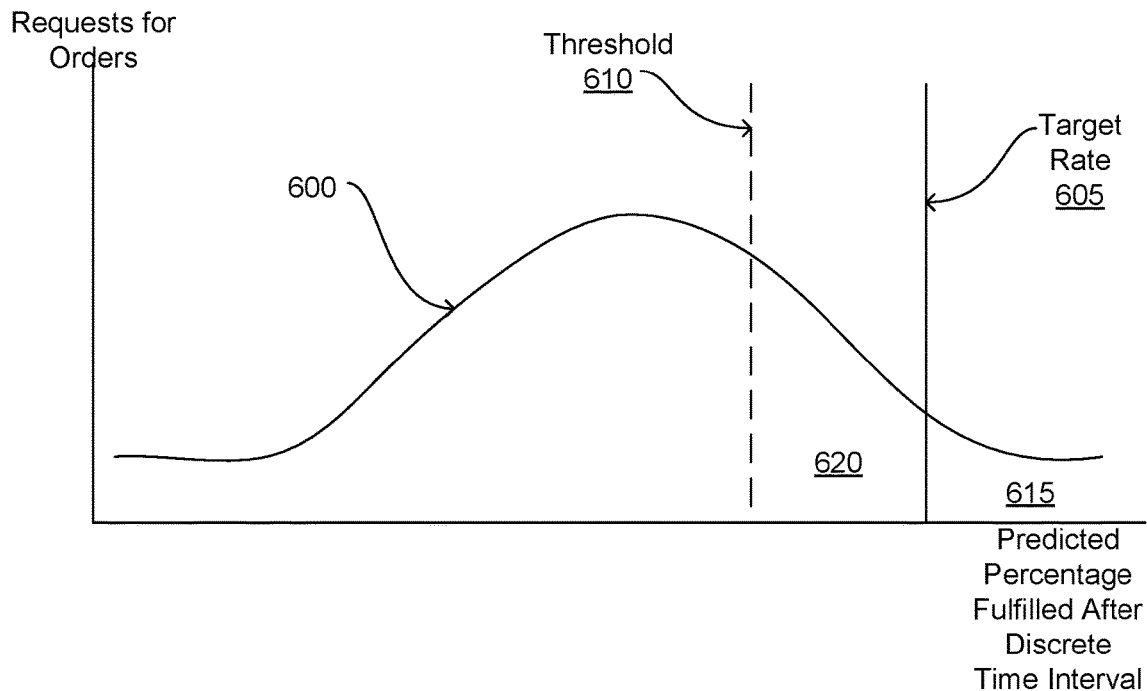
FIG. 6 is an example histogram of a predicted percentage of orders fulfilled after a specific discrete time interval for short term fulfillment against a number of requests for orders received by an online concierge system, according to one embodiment.

FIG. 6 shows an example histogram 600 of a predicted percentage of orders fulfilled after a specific discrete time interval for short term fulfillment of an order within a specific duration from times when requests for the orders were received against a number of requests for orders received. As further described above, the predicted percentage of an order being fulfilled after the specific discrete time interval is determined from application of the model at a time nearest receipt of a request for the order, but not after the request for the order was received. FIG. 6 also shows a target rate 605 of orders fulfilled after the specific discrete time interval specified by the online concierge system 102 to provide a maximum percentage of orders capable of being fulfilled after the specific discrete time interval. Also, FIG. 6 shows a threshold 610 that is less than the target rate 610, with the threshold 610 identifying a percentage of orders fulfilled after the specific discrete time interval.

When the online concierge system 102 receives requests orders having predicted percentages of being fulfilled after the specific discrete time interval that equal or exceed the target rate 605, the online concierge system 102 does not identify the specific discrete time interval as available for fulfilling the order. This prevents users from selecting the specific discrete time interval where the predicted percentage of the order being fulfilled after the specific discrete time interval is at least the target rate 605. Hence, the online concierge system 102 prevents users from selecting the specific discrete time interval when the predicted percentage of the order being fulfilled after the specific discrete time interval equals or exceeds the target rate 605, so requests for orders 615 in FIG. 6 would be precluded from selecting the specific discrete time interval. For example, when the online concierge system 102 receives a request for an order from a user and determines a predicted percentage of the order being fulfilled after the specific discrete time interval equals or exceeds the target rate, the online concierge system 102 transmits an interface to a client device of the user that indicates the specific discrete time interval is unavailable for selection or that does not identify the specific discrete time interval to the user.

To prevent from identifying the specific discrete time interval as unavailable for fulfilling orders, for orders having predicted percentages of being fulfilled after the specific discrete time interval that equal or exceed the threshold 610 but that are less than the target rate 605, the online concierge system 102 determines an increased price for fulfilling those orders during the specific discrete time interval. Increasing the price allows users to select the specific discrete time interval for order fulfillment when the percentage of the order being fulfilled after the discrete time interval equals or exceeds the threshold 610, but at an increased cost. This increased cost reduces a number of orders identifying the specific discrete time interval for order fulfillment during the discrete time interval, to reduce a likelihood of subsequently received orders having predicted percentages of being fulfilled after the specific discrete time interval equaling or exceeding the target rate 605, maintaining availability of the specific discrete time interval for selection by a greater number of requests for orders. In the example of FIG. 6, requests for orders 620 received with predicted percentages of being fulfilled after the specific discrete time interval that equal or exceed the threshold 610 are capable of selecting the specific discrete time interval for fulfillment, but at an increased price.

Figure 7:
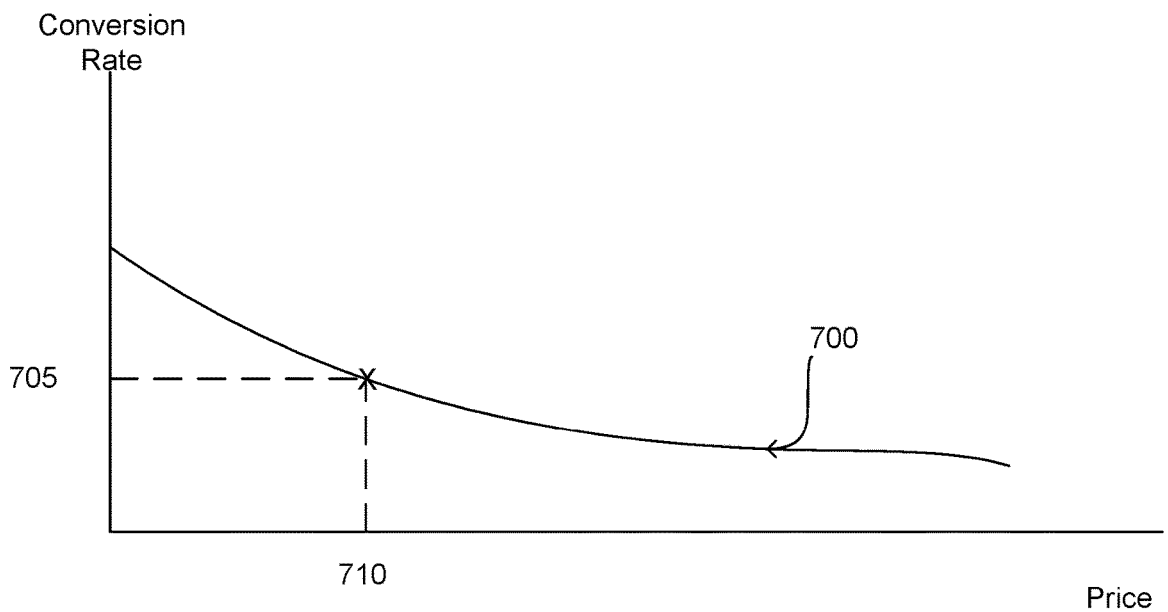
FIG. 7 shows an example price elasticity curve showing conversion rates for orders against prices charged for order fulfillment, in accordance with an embodiment.

Referring back to FIG. 5, in various embodiments, to determine 555 the increased price of the specific discrete time interval, the online concierge system 102 generates or retrieves a price elasticity curve, which correlates increased prices with a conversion rate. For example, the conversion rate identifies a rate at which users place an order with the online concierge system 102, allowing the price elasticity curve to indicate a rate at which users place an order with the online concierge system 102 when the users are charged different increased prices. FIG. 7 shows an example price elasticity curve 700 showing conversion rates for orders against prices charged for order fulfillment. In various embodiments, the conversion rate is a rate at which users provide orders to the online concierge system 102, allowing the price elasticity curve to show an effect of different prices for order fulfillment on a likelihood of users providing an order to the online concierge system 102. Hence, in the example of FIG. 7, conversion rate 705 corresponds to price 710 for order fulfillment. In various embodiments, the online concierge system 102 generates the price elasticity curve 700 based on historical orders received from users and prices presented to users for the historical orders using any suitable method or combination of methods (e.g., regression analysis, interpolation, etc.), allowing the online concierge system 102 to leverage information about prior orders received from users to determine how changes in prices for fulfilling an order affects a rate at which users place orders with the online concierge system 102 for fulfillment.

Referring back to FIG. 5, in various embodiments, the online concierge system 102 selects a specific conversion rate and determines 555 the increased price of the specific discrete time interval as a price corresponding to the specific conversion rate on the price elasticity curve. Alternatively, the online concierge system 102 determines a conversion rate for the increased price based on a conversion rate for the standard price from the price elasticity curve, a number of received requests for orders with a predicted percentage of being fulfilled after the specific discrete time interval greater than the threshold from the target rate and less than the target rate, and a number of received requests for orders with a predicted percentage of being fulfilled after the specific discrete time interval greater than the target rate. For example, the conversion rate at the increased price is a ratio of a product of the number of received requests for orders with a predicted percentage of being fulfilled after the specific discrete time interval greater than the threshold from the target rate and less than the target rate and the conversion rate at the standard price to a sum of the number of received requests for orders with the predicted percentage of being fulfilled after the specific discrete time interval greater than the threshold from the target rate and less than the target rate and the number of received requests for orders with the predicted percentage of being fulfilled after the specific discrete time interval greater than the target rate. Referring to FIG. 6 for illustration, the conversion rate at the increased price is a ratio of a product of the number of received requests 620 for orders and the conversion rate at the standard price to a sum of the number of received requests 620 for orders and the number of received requests 615 for orders. In various embodiments, the online concierge system 102 determines a conversion rate for the specific discrete time interval for determining 555 the increased price of the specific discrete time interval so a product of the number of received requests for orders with a predicted percentage of being fulfilled after the specific discrete time interval greater than the threshold from the target rate and less than the target rate and the conversion rate at the standard price equals a product of the conversion rate at the increased price and a sum of the number of received requests for orders with the predicted percentage of being fulfilled after the specific discrete time interval greater than the threshold from the target rate and less than the target rate and the number of received requests for orders with the predicted percentage of being fulfilled after the specific discrete time interval greater than the target rate.

Figure 8:
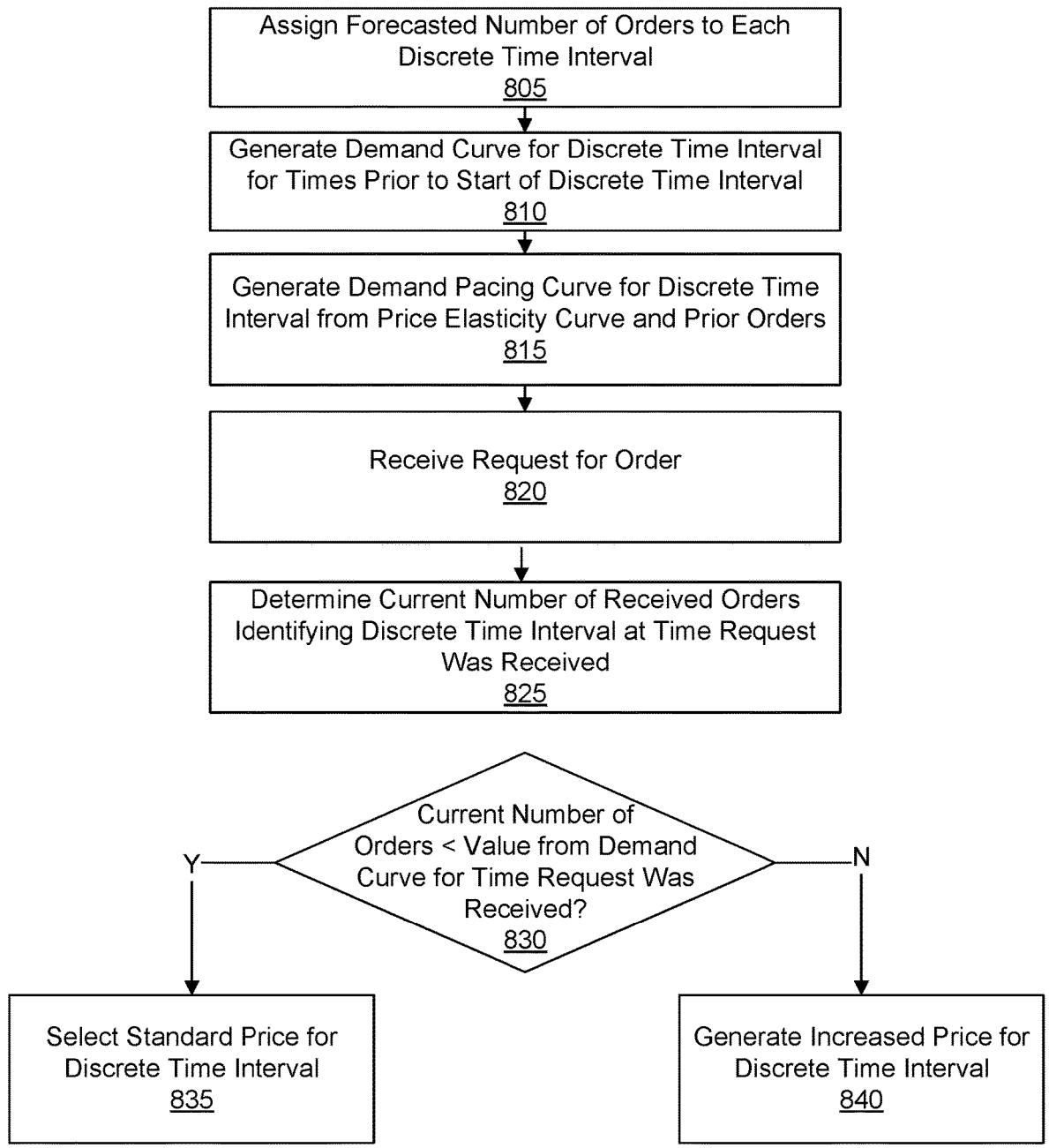
FIG. 8 is a flowchart of a method for adjusting a price for a discrete time interval for fulfillment of an order by an online concierge system greater than a duration from a time when a request for the order was received, in accordance with an embodiment.

The online concierge system 102 transmits an interface identifying the specific discrete time interval and the increased price determined 555 for the specific discrete time interval to a client device for display to the user. In various embodiments, the interface identifies the specific discrete time interval and other discrete time intervals along with prices corresponding to each discrete time interval (i.e., a standard price or an increased price corresponding to each discrete time interval). The user subsequently selects a discrete time interval for fulfilling the order, allowing the user to account for the prices determined for various discrete time intervals when selecting the discrete time interval for order fulfillment. Additionally, when the FIG. 8 is a flowchart of one embodiment of a method for adjusting a price for a discrete time interval for fulfillment of an order by an online concierge system 102 greater than a duration from a time when a request for the order was received. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

While the method described above in conjunction with FIGS. 5-7 describes increasing a price for a specific discrete time interval for short term fulfillment of an order by the online concierge system 102, the online concierge system 102 allows users to select a discrete time interval for fulfilling the order greater than a duration from a time when a request for the order was received. For example, the specific discrete time interval specifies short-term fulfillment of the order within a specific duration of a time when the request for the order was received, while other discrete time intervals specify fulfillment of the order at times greater than the specific duration from the time when the request for the order was received. For discrete time intervals later than the specific duration of the time when the request for the order was received, the online concierge system 102 has more limited information for determining a predicted percentage of orders being fulfilled after the discrete time interval.

To regulate a number of orders specifying fulfillment during a discrete time interval later than the specific duration from the time when a request for an order was received, the online concierge system 102 assigns 805 a forecasted number of orders to each discrete time interval later than the specific duration from the time when a request for an order was received. The forecasted number of orders for a discrete time interval is based on prior numbers of orders identifying the discrete time interval, an estimated number of shoppers available to fulfill orders during the discrete time interval, and any other suitable information in various embodiments. Hence, the forecasted number of orders allows the online concierge system 102 to specify a maximum number of orders capable of being fulfilled during the discrete time interval. In various embodiments, when the online concierge system 102 receives the forecasted number of orders identifying the discrete time interval, the discrete time interval is withheld from selection by users for order fulfillment.

Additionally, the online concierge system 102 generates 810 a demand curve for the discrete time interval from times when the online concierge system 102 previously received orders identifying the discrete time interval relative to a start of the discrete time interval. In various embodiments, the demand curve identifies a percentage of orders identifying the discrete time interval at different times before a start of the discrete time interval. For example, the demand curve identifies a percentage of orders identifying the discrete time interval that were received different numbers of hours before a start of the discrete time interval (e.g., received four hours before the start of the discrete time interval, received one hour before the start of the discrete time interval, etc.). Hence, the demand curve identifies when the online concierge system 102 receives orders identifying the discrete time interval for fulfillment relative to the start of the discrete time interval. The online concierge system 102 determines the demand curve for the discrete time interval using any suitable method or combination of methods (e.g., regression analysis, interpolation, etc.) in various embodiments. Additionally, different discrete time intervals have different demand curves, as the demand curve for a particular discrete time interval is determined from previously received orders identifying the particular discrete time interval for fulfillment. In some embodiments, the online concierge system 102 generates 810 a demand curve for various combinations of geographic region and discrete time interval, allowing the online concierge system 102 to maintain different demand curves for a discrete time interval corresponding to different geographic regions, allowing the online concierge system 102 to account for different ordering patterns in different geographic regions. Similarly, the online concierge system 102 may generate 810 a demand curve for various combinations of warehouse 110 and discrete time interval, allowing maintenance of demand curves for discrete time intervals that are specific to different warehouses 110, allowing the online concierge system 102 to account for different patterns of ordering from different warehouses 110.

From the price elasticity curve that correlates increased prices with a conversion rate, as further described above in conjunction with FIGS. 5 and 7, the forecasted number, and the previously received orders identifying a discrete time interval, the online concierge system 102 generates 815 a demand pacing curve for the discrete time interval. For example, the conversion rate identifies a rate at which users place an order with the online concierge system 102, so the price elasticity curve to indicate a rate at which users place an order with the online concierge system 102 when the users are charged different increased prices, providing the online concierge system 102 with a measure of how different prices affect a likelihood of a user placing an order for fulfillment. In various embodiments, the demand pacing curve specifies a rate at which users place orders with the online concierge system 102 identifying the discrete time interval at different times prior to a start of the discrete time interval so a number of orders identifying the discrete time interval equals the forecasted value for the discrete time interval at the start of the discrete time interval. The demand pacing curve specifies a threshold for number of orders received at different times prior to a start of the discrete time interval. When a number of orders identifying the discrete time interval at a time prior to the start of the discrete time interval is less than a value for the time on the demand curve, the number of orders identifying the discrete time interval for fulfillment is not likely to exceed the threshold value for the discrete time interval (or is not likely to reach the threshold value for the discrete time interval before the start of the discrete time interval), so the online concierge system 102 maintains a standard price for the discrete time interval. However, when number of orders identifying the discrete time interval at a time prior to the start of the discrete time interval greater than a value for the time on the demand curve, the number of orders identifying the discrete time interval for fulfillment is likely to exceed the threshold value for the discrete time interval (or reach the threshold value prior to the start of the discrete time interval). So, the online concierge system 102 determines an increased price for the discrete time interval when the number of orders at a time prior to the start of the discrete time interval exceeds a value specified by the demand pacing curve at the time prior to the start of the discrete time interval, with the increased price seeking to reduce a number of orders identifying the discrete time interval for fulfillment.

When the online concierge system 102 receives 820 a request for an order, the online concierge system 102 determines 825 a current number of orders identifying the discrete time interval from orders previously received by the online concierge system 102. The online concierge system 102 determines 830 whether the current number of orders identifying the discrete time interval exceeds a value for the time relative to the start of the discrete time interval at which the request for the order was received 820 from the demand pacing curve. In response to determining 830 the current number of orders identifying the discrete time interval does not exceed the value for the time relative to the start of the discrete time interval at which the request for the order was received 820 from the demand pacing curve, the online concierge system 102 selects 835 a standard price for the discrete time interval. However, in response to determining 830 the current number of orders identifying the discrete time interval exceeds the value for the time relative to the start of the discrete time interval at which the request for the order was received 820 from the demand pacing curve, the online concierge system 102 generates 840 an increased price for the discrete time interval. As further described in conjunction with FIG. 5, in various embodiments the online concierge system 102 generates 840 the increased price for the discrete time interval from the price elasticity curve to select an increased price corresponding to a desired conversion rate that slows receipt of orders identifying the discrete time interval for fulfillment. By generating 840 the increased price for the discrete time interval, the online concierge system 102 allows the discrete time interval to remain available for selection for order fulfillment for a greater number of requests for orders, providing users with a greater number of discrete time intervals for fulfilling orders, while the increased price for the discrete time interval decreases a rate at which users select the discrete time interval for order fulfillment. The online concierge system 102 transmits an interface to a client device of a user from whom the request was received identifying the discrete time interval and the standard price selected 835 for the discrete time interval or the increased price generated 840 for the discrete time interval. As further described above in conjunction with FIG. 5, the interface may identify multiple discrete time intervals and prices corresponding to different discrete time intervals, allowing a user to select a discrete time interval for fulfilling the order via the interface.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
at an online concierge system comprising at least one processor and memory:
maintaining a plurality of time intervals for fulfilling orders received by the online concierge system;
receiving a plurality of orders for fulfillment;
assigning forecasted number of orders for each time interval of the plurality of time intervals;
training a machine learning model based on a set of training data, the machine learning model configured to predict a conversion rate within a time interval, wherein training the machine learning model comprises:
applying the machine learning model to samples of the training data, each sample with a label indicating whether the sample was fulfilled within a target time interval or was fulfilled after the target time interval, and modifying one or more parameters of the machine learning model until a difference between a predicted percentage of fulfillment outputted by the machine learning model and recorded percentage of fulfillment reflected by labels in the training data satisfies one or more criteria;

retraining the machine learning model, wherein retraining the machine learning model comprises:

determining that the predicted percentage of fulfillment after the specific time interval for the requested order is less than a threshold, responsive to determining that the predicted percentage of fulfillment after the specific time interval for the requested order is not less than the threshold, determining an increased rate for fulfillment of the requested order during the specific time interval, the increased rate greater than a standard rate for the specific time interval, and updating the machine learned model following retraining of the machine learned model with new training datasets;

generating, for each time interval of the plurality of time intervals, an elasticity curve based on the conversion rate predicted by the machine learning model;

receiving a request from a user for a requested order at the online concierge system, the request identifying a specific time interval for fulfillment of the requested order;

retrieving a specific elasticity curve generated for the specific time interval;

selecting a conversion rate for the specific time interval; and transmitting, for display at an interface of a client device of the user including, a specific rate for the specific time interval determined based on the conversion rate and the specific elasticity curve generated for the specific time interval.

2. The computer-implemented method of claim 1, wherein the specific rate is determined from a rate at which users place orders with a standard price, a number of received requests for orders having a predicted percentage of being fulfilled after the specific time interval that is greater than a threshold from the target rate and less than the target rate, and a number of received requests for orders with a predicted percentage of being fulfilled after the specific time interval greater than the target rate.

3. The computer-implemented method of claim 1, further comprising:

identifying an additional time interval fulfilling the requested order later than the specific time;

obtaining a demand pacing curve for the additional time interval, the demand pacing curve specifying a rate at which users place orders with the online concierge system identifying the additional time interval at different times so a number of orders identifying the additional time interval equals a forecasted value for the additional time interval at a start of the additional time interval;

determining a current number of orders received by the online concierge system identifying the additional time interval for fulfillment at the time when the request was received;

determining that the current number of orders is less than a value for the time when the request was received from the demand pacing curve for the additional time interval;

responsive to determining the current number of orders is not less than the value for the time when the request was received from the demand pacing curve for the additional time interval, generating an increased price for the additional time interval; and transmitting the interface from the online concierge system to the client device of the user including the increased price determined for the additional time interval for display to the user.

4. The computer-implemented method of claim 1, wherein generating, for each time interval of the plurality of time intervals, the elasticity curve based on the conversion rate predicted by the machine learning model comprises:

retrieving historical orders received from users and rates presented to the users;

determining changes in prices for fulfilling an order affects a rate at which the users place orders with the online concierge system for fulfillment; and determining the elasticity curve according to the changes in prices relative to the rate at which the users place orders with the online concierge system for fulfillment.

5. The computer-implemented method of claim 1, wherein generating, for each time interval of the plurality of time intervals, the elasticity curve based on the conversion rate predicted by the machine learning model comprises:

retrieving historical orders received from users and rates presented to the users;

applying a regression analysis to analyze the historical orders relative to the rates presented to the users; and determining the elasticity curve according to the regression analysis.

6. The computer-implemented method of claim 1, wherein generating, for each time interval of the plurality of time intervals, the elasticity curve based on the conversion rate predicted by the machine learning model comprises:

retrieving historical orders received from users and rates presented to the users;

applying an interpolation to analyze the historical orders relative to the rates presented to the users; and determining the elasticity curve according to the interpolation.

7. The computer-implemented method of claim 1, wherein selecting the conversion rate for the specific time interval comprises:

generating a demand curve for the specific time interval, the demand curve identifying a percentage of orders that are received before the specific time interval;

generating a demand pacing curve specifying a rate at which users place orders with the online concierge system; and selecting the conversion rate for the specific time interval based on the demand pacing curve.

8. A non-transitory computer-readable medium configured to store code comprising instructions, wherein the instructions, when executed by one or more processors, cause the one or more processors to:

maintain a plurality of time intervals for fulfilling orders received by an online concierge system;

receive a plurality of orders for fulfillment;

assign forecasted number of orders for each time interval of the plurality of time intervals;

train a machine learning model based on a set of training data, the machine learning model configured to predict a conversion rate within a time interval, wherein training the machine learning model comprises:

applying the machine learning model to samples of the training data, each sample with a label indicating whether the sample was fulfilled within a target time interval or was fulfilled after the target time interval, and modifying one or more parameters of the machine learning model until a difference between a predicted percentage of fulfillment outputted by the machine learning model and recorded percentage of fulfillment reflected by labels in the training data satisfies one or more criteria;

retrain the machine learning model, wherein retraining the machine learning model comprises:

determining that the predicted percentage of fulfillment after the specific time interval for the requested order is less than a threshold, responsive to determining that the predicted percentage of fulfillment after the specific time interval for the requested order is not less than the threshold, determining an increased rate for fulfillment of the requested order during the specific time interval, the increased rate greater than a standard rate for the specific time interval, and updating the machine learned model following retraining of the machine learned model with new training datasets;

generate, for each time interval of the plurality of time intervals, an elasticity curve based on the conversion rate predicted by the machine learning model;

receive a request from a user for a requested order at the online concierge system, the request identifying a specific time interval for fulfillment of the requested order;

retrieve a specific elasticity curve generated for the specific time interval;

select a conversion rate for the specific time interval; and transmit, for display at an interface of a client device of the user including, a specific rate for the specific time interval determined based on the conversion rate and the specific elasticity curve generated for the specific time interval.

9. The non-transitory computer-readable medium of claim 8, wherein the specific rate is determined from a rate at which users place orders with a standard price, a number of received requests for orders having a predicted percentage of being fulfilled after the specific time interval that is greater than a threshold from the target rate and less than the target rate, and a number of received requests for orders with a predicted percentage of being fulfilled after the specific time interval greater than the target rate.

10. The non-transitory computer-readable medium of claim 8, wherein the instructions, when executed, further cause the one or more processors to:

identify an additional time interval fulfilling the requested order later than the specific time;

obtain a demand pacing curve for the additional time interval, the demand pacing curve specifying a rate at which users place orders with the online concierge system identifying the additional time interval at different times so a number of orders identifying the additional time interval equals a forecasted value for the additional time interval at a start of the additional time interval;

determine a current number of orders received by the online concierge system identifying the additional time interval for fulfillment at the time when the request was received;

determine that the current number of orders is less than a value for the time when the request was received from the demand pacing curve for the additional time interval;

responsive to determining the current number of orders is not less than the value for the time when the request was received from the demand pacing curve for the additional time interval, generate an increased price for the additional time interval; and transmit the interface from the online concierge system to the client device of the user including the increased price determined for the additional time interval for display to the user.

11. The non-transitory computer-readable medium of claim 8, wherein the instructions for generating, for each time interval of the plurality of time intervals, the elasticity curve based on the conversion rate predicted by the machine learning model comprise instructions to:

retrieve historical orders received from users and rates presented to the users;

determine changes in prices for fulfilling an order affects a rate at which the users place orders with the online concierge system for fulfillment; and determine the elasticity curve according to the changes in prices relative to the rate at which the users place orders with the online concierge system for fulfillment.

12. The non-transitory computer-readable medium of claim 8, wherein the instructions for generating, for each time interval of the plurality of time intervals, the elasticity curve based on the conversion rate predicted by the machine learning model comprise instructions to:

retrieve historical orders received from users and rates presented to the users;

apply a regression analysis to analyze the historical orders relative to the rates presented to the users; and determine the elasticity curve according to the regression analysis.

13. The non-transitory computer-readable medium of claim 8, wherein the instructions for generating, for each time interval of the plurality of time intervals, the elasticity curve based on the conversion rate predicted by the machine learning model comprise instructions to:

retrieve historical orders received from users and rates presented to the users;

apply an interpolation to analyze the historical orders relative to the rates presented to the users; and determine the elasticity curve according to the interpolation.

14. The non-transitory computer-readable medium of claim 8, wherein the instructions for selecting the conversion rate for the specific time interval comprise instructions to:

generate a demand curve for the specific time interval, the demand curve identifying a percentage of orders that are received before the specific time interval;

generate a demand pacing curve specifying a rate at which users place orders with the online concierge system; and select the conversion rate for the specific time interval based on the demand pacing curve.

15. A system comprising:

one or more processors; and memory configured to store code comprising instructions, wherein the instructions, when executed by the one or more processors, cause the one or more processors to:

maintain a plurality of time intervals for fulfilling orders received by an online concierge system;

receive a plurality of orders for fulfillment;
assign forecasted number of orders for each time interval of the plurality of time intervals;
train a machine learning model based on a set of training data, the machine learning model configured to predict a conversion rate within a time interval, wherein training the machine learning model comprises:
  applying the machine learning model to samples of the training data, each sample with a label indicating whether the sample was fulfilled within a target time interval or was fulfilled after the target time interval, and
  modifying one or more parameters of the machine learning model until a difference between a predicted percentage of fulfillment outputted by the machine learning model and recorded percentage of fulfillment reflected by labels in the training data satisfies one or more criteria;
retrain the machine learning model, wherein retraining the machine learning model comprises:
  determining that the predicted percentage of fulfillment after the specific time interval for the requested order is less than a threshold,
  responsive to determining that the predicted percentage of fulfillment after the specific time interval for the requested order is not less than the threshold, determining an increased rate for fulfillment of the requested order during the specific time interval, the increased rate greater than a standard rate for the specific time interval, and
  updating the machine learned model following retraining of the machine learned model with new training datasets;
generate, for each time interval of the plurality of time intervals, an elasticity curve based on the conversion rate predicted by the machine learning model;
receive a request from a user for a requested order at the online concierge system, the request identifying a specific time interval for fulfillment of the requested order;
retrieve a specific elasticity curve generated for the specific time interval;
select a conversion rate for the specific time interval; and
transmit, for display at an interface of a client device of the user including, a specific rate for the specific time interval determined based on the conversion rate and the specific elasticity curve generated for the specific time interval.

16. The system of claim 15, wherein the instructions for generating, for each time interval of the plurality of time intervals, the elasticity curve based on the conversion rate predicted by the machine learning model comprise instructions to:
  retrieve historical orders received from users and rates presented to the users;
  apply a regression analysis to analyze the historical orders relative to the rates presented to the users; and
  determine the elasticity curve according to the regression analysis.

17. The system of claim 15, wherein the instructions for selecting the conversion rate for the specific time interval comprise instructions to:
  generate a demand curve for the specific time interval, the demand curve identifying a percentage of orders that are received before the specific time interval;
  generate a demand pacing curve specifying a rate at which users place orders with the online concierge system; and
  select the conversion rate for the specific time interval based on the demand pacing curve.

* * * * *